United States Patent [19]

Norimatsu et al.

[11] 4,251,989
[45] Feb. 24, 1981

[54] AIR-FUEL RATIO CONTROL SYSTEM

[75] Inventors: Hideaki Norimatsu, Toyohashi; Sigenori Isomura, Kariva, both of Japan

[73] Assignee: Nippondenso Co., Ltd., Kariya, Japan

[21] Appl. No.: 56,311

[22] Filed: Jul. 10, 1979

[30] Foreign Application Priority Data

Sep. 8, 1978 [JP] Japan .................. 53-110876

[51] Int. Cl.³ .................................. F01N 3/15
[52] U.S. Cl. ........................ 60/276; 60/285; 123/440; 123/489
[58] Field of Search ................. 60/276, 285; 123/119 EC, 32 EE

[56] References Cited

U.S. PATENT DOCUMENTS

| 3,782,347 | 1/1974 | Schmidt | 60/276 |
| 3,875,907 | 4/1975 | Wessel | 60/276 |
| 3,939,654 | 2/1976 | Creps | 60/276 |
| 3,990,411 | 11/1976 | Toelle | 60/276 |
| 4,007,589 | 2/1977 | Neidhard | 60/276 |
| 4,130,095 | 12/1978 | Bowler | 60/276 |

Primary Examiner—Douglas Hart
Attorney, Agent, or Firm—Cushman, Darby & Cushman

[57] ABSTRACT

An air-fuel ratio control system comprises a comparator circuit for comparing a predetermined reference level with an output signal of a first oxygen sensor disposed upstream of a three-way catalyst for purifying the exhaust gas in the exhaust system of an internal combustion engine, the comparator circuit producing a signal indicative of whether the output signal of the first oxygen sensor is higher (lean) or lower (rich) than a predetermined air-fuel ratio, a delay circuit for delaying at least one of the output signals of the comparator circuit, and a delay time adjusting circuit for adjusting the delay time of the signal delayed by the delay circuit, in accordance with the value of the output signal of a second oxygen sensor disposed downstream of the three-way catalyst.

2 Claims, 5 Drawing Figures

AIR-FUEL RATIO CONTROL SYSTEM

BACKGROUND OF THE INVENTION

This invention relates to an air-fuel ratio control system capable of controlling the air-fuel ratio accurately regardless of changes in characteristics of oxygen concentration detectors in the case of negative feedback control of the air-fuel ratio by detecting the oxygen concentration in the exhaust gas for purifying the exhaust gas of an internal combustion engine.

The purifying ability of a catalyst is very high when the air-fuel ratio of the mixture gas is at or near a predetermined (stoichiometric) air-fuel ratio (air excess rate $\lambda = 1$). In view of this, in a conventional system suggested for purifying the exhaust gas by use of a three-way catalyst in the exhaust system of the internal combustion engine, the oxygen concentration in the exhaust gas representing the air-fuel ratio of the mixture gas is detected by an oxygen concentration detector (which may hereinafter be called the oxygen sensor) and the air-fuel ratio of the mixture gas is controlled to about the stoichiometric value by negative feedback. The output characteristics of this oxygen sensor, however, greatly vary with time or according to the production processes. In the case where this oxygen sensor is placed upstream of the three-way catalyst in the exhaust system of an internal combustion engine, the output characteristics thereof in relation to the air-fuel ratio vary, for example, between the oxygen sensors S1 and S2 as shown in FIG. 1A. Therefore, even if a reference level Vs is set corresponding to the target stoichiometric value ($\lambda = 1$) for negative feedback control, and accurate control of the stoichiometric air-fuel ratio may be attained for the oxygen sensor S1, while an air-fuel ratio lower than the stoichiometric value is attained for the other oxygen sensor S2, thus resulting in the loss of the effect of the three-way catalyst.

In the case where the oxygen sensor is disposed downstream of the three-way catalyst, on the other hand, it was confirmed that as shown in FIG. 1B, the curves of the detection voltage characteristics of the oxygen sensors S1 and S2 with respect to the air-fuel ratio pass the set reference level Vs at or near the stoichiometric air-fuel ratio. In this way, the oxygen sensor may be placed downstream of the three-way catalyst for negative feedback control of the air-fuel ratio, but in this case it is apparent that a system response delay occurs unlike in the case where the oxygen sensor is placed upstream of the three-way catalyst.

In order to obviate this problem, the present inventors suggested earlier a system having a first oxygen sensor provided upstream of the three-way catalyst in the exhaust system of an internal combustion engine for negative feedback control of the air-fuel ratio, in which a second oxygen sensor is placed downstream of the three-way catalyst and the reference level for comparison with the detection signal of the first oxygen sensor is regulated by the detection signal of the second oxygen sensor, thus compensating for the lack of uniformity of output characteristics of the first oxygen sensor. It has been found, however, that in this system controlling the reference level, the feedback control system is not sufficiently stable to be used in actual application.

SUMMARY OF THE INVENTION

An object of the present invention is to provide an air-fuel ratio control system comprising a comparator circuit for comparing the output signal of a first oxygen sensor with a predetermined reference level and producing a signal indicative of whether the actual air-fuel ratio is higher or lower than a predetermined ratio, a delay circuit for delaying at least one of the signals produced from the comparator circuit, a delay time adjusting circuit for adjusting the delaying time of the signal delayed by the delay circuit, in accordance with the value of the output signal of a second oxygen sensor, and means for directly correcting the time width of the signal indicative of whether the actual air-fuel ratio is higher or lower than the predetermined ratio, in response to the output signal of the second oxygen sensor, thereby compensating for the lack of uniformity of the oxygen sensors while maintaining the operation of the feedback control system sufficiently stable.

DESCRIPTION OF THE PREFERRED EMBODIMENTS

Figure 2:
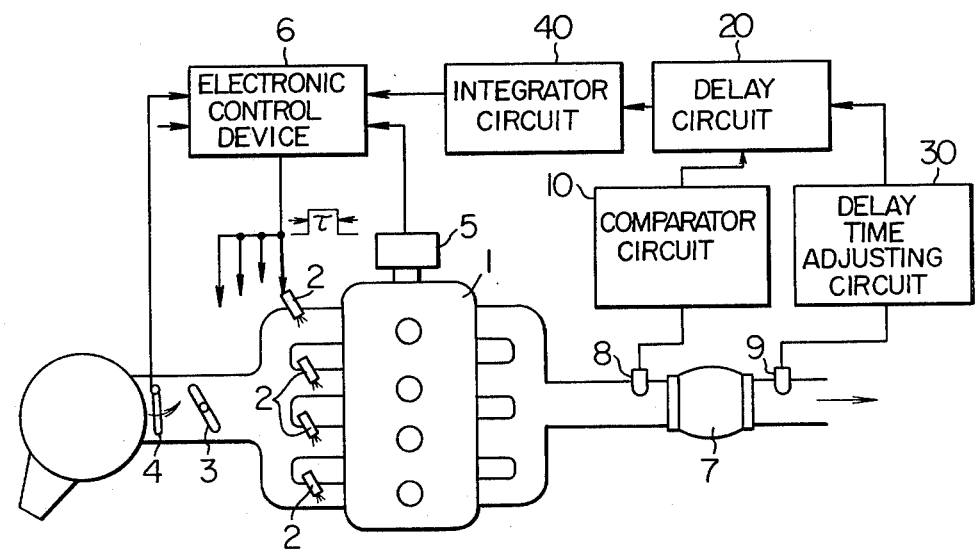
FIG. 2 is a partial block diagram showing an embodiment of the present invention.

An embodiment of the present invention shown in FIGS. 2 and 3 will be explained below. In FIG. 2, reference numeral 1 shows an internal combustion engine having a plurality of cylinders, the intake manifold of which contains a fuel injection valve 2 electromagnetically operated. Further, a throttle valve 3 and an intake amount detector 4 are arranged upstream of the fuel injection valves 2. Detection signals from the intake amount detector 4, the r.p.m. detector 5 or other devices such as a temperature sensor are applied to the electronic control device 6. The electronic control device 6 applies to the fuel injection valves 2 a pulse signal of time width $\tau$ in accordance with the detection value of each detector, thereby controlling the amount of fuel supply to the internal combustion engine 1. The exhaust system of the internal combustion engine 1 has a three-way catalyst 7 for effectively purifying the CO, HC and NOx components of the exhaust gas. A first oxygen concentration detector (oxygen sensor) 8 and a second oxygen concentration detector (oxygen sensor) 9 capable of detecting the oxygen concentration of the exhaust gas are arranged upstream and downstream of the three-way catalyst 7 respectively. Numeral 10 shows a comparator circuit for comparing the output voltage of the first oxygen sensor 8 with a predetermined reference level corresponding to a predetermined air-fuel ratio to discriminate whether the actual air-fuel ratio is higher (lean) or lower (rich) than the predetermined air-fuel ratio. Numeral 20 shows a delay circuit for delaying the lean signal (indicating that the actual air-fuel ratio is higher than the predetermined ratio) or the rich signal (indicating that the actual air-fuel ratio is lower than the predetermined ratio) produced from the comparator circuit 10, in order to adjust the output time width thereof. Numeral 30 is a delay time adjusting circuit for adjusting the delay time of the rich signal and the lean signal delayed by the delay circuit 20, in accordance with the output signal of the second oxygen sensor. Numeral 40 shows a well-known integrator circuit for generating an integration voltage to increase or decrease the air-fuel ratio correcting voltage (i.e., the correction ratio) in response to the output of the delay circuit 20. The electronic control device 6 functions as an air-fuel ratio adjusting means whereby the time width $\tau$ of the pulse signal regulating the amount of fuel injection is corrected in response to the output voltage of the integrator circuit 40, thereby controlling the actual air-fuel ratio to the predetermined ratio. This device 6 is well known from various reference materials and will not be explained in detail here. This electronic control device 6 may be replaced with equal effect by other types of well-known air-fuel ratio regulator means such as means for controlling the amount of fuel supply or air supply to the carburetor or the amount of the secondary air supplied to the engine exhaust system.

Figure 3:
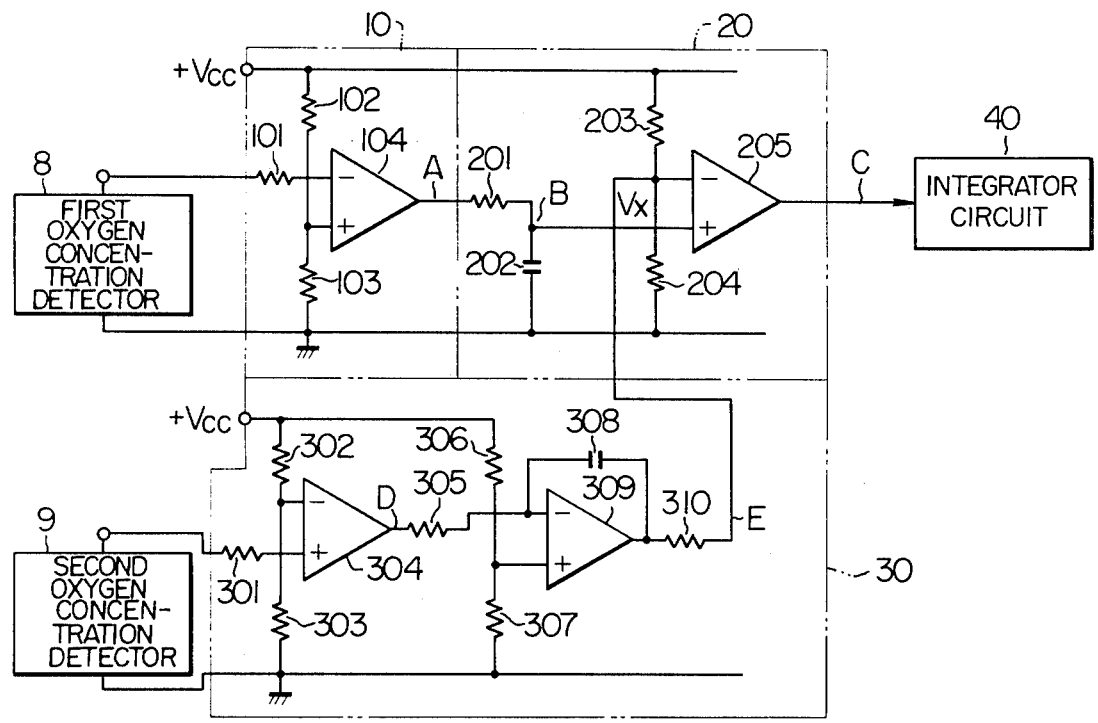
FIG. 3 is an electrical circuit diagram showing a configuration of the essential parts in the block diagram of FIG. 2.

The electrical circuit of the essential parts of the circuit of FIG. 2 is shown in detail in FIG. 3. The comparator circuit 10 includes resistors 101, 102 and 103 and a comparator 104, and the delay circuit 20 includes resistors 201, 203 and 204, a capacitor 202 and a comparator 205. The delay time adjusting circuit 30 comprises a comparator section including resistors 301, 302 and 303 and a comparator 304, an integrator section including resistors 305, 306, 307 and 310, an operational amplifier 309 and a capacitor 308 making up an integrator. The comparator 304 compares the output voltage of the second oxygen sensor 9 with a reference level corresponding to a predetermined (stoichiometric) air-fuel ratio depending on the resistors 302 and 303, and the integrator in the subsequent stage integrates the output of the comparator. In FIG. 3, the character +Vcc indicates a constant voltage.

Now, the operation of the above-mentioned system will be explained with reference to the waveform diagram of FIG. 4. The output of the comparator circuit 10 is reversed in accordance with the output voltage of the first oxygen sensor 8, i.e., the air-fuel ratio in the exhaust system of the engine 1. In other words, the comparator 10 produces a high level signal when the actual air-fuel ratio is higher than the predetermined value or the mixture gas is lean, and a low level signal when the actual air-fuel ratio is lower than the predetermined value, i.e., the mixture gas is rich, as shown in (A) of FIG. 4. The output of the comparator circuit 10 is stored in and discharged from the capacitor 202 of the delay circuit 20 as shown in (B) of FIG. 4. The potential at the terminal B of the capacitor 202 is compared with the reference level Vx determined by the delay time adjusting circuit 30 by the comparator 205. In this way, the rich and lean signals of the comparator circuit 10 are delayed, so that the time width relationship of the signals is controlled to a predetermined one as shown in (C) of FIG. 4, with the result that the variation in characteristics caused by the lack of uniformity of the oxygen sensors is compensated for as described later.

Figure 1A:
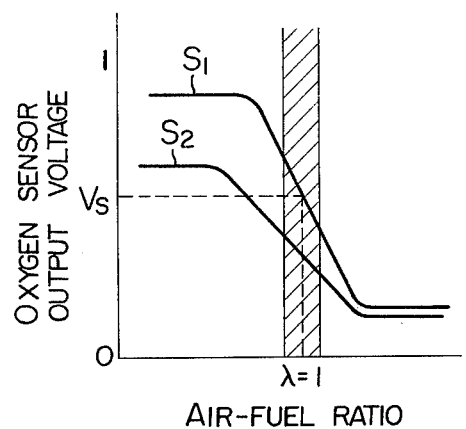
FIGS. 1A and 1B are output characteristics diagrams showing output changes with respect to the air-fuel ratio for the oxygen concentration detectors disposed upstream and downstream of the three-way catalyst respectively.
Figure 1B:
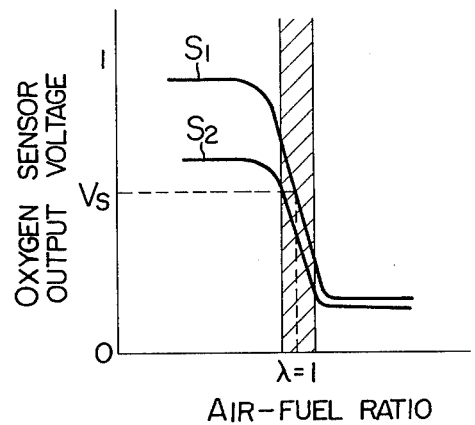
Figure 4:
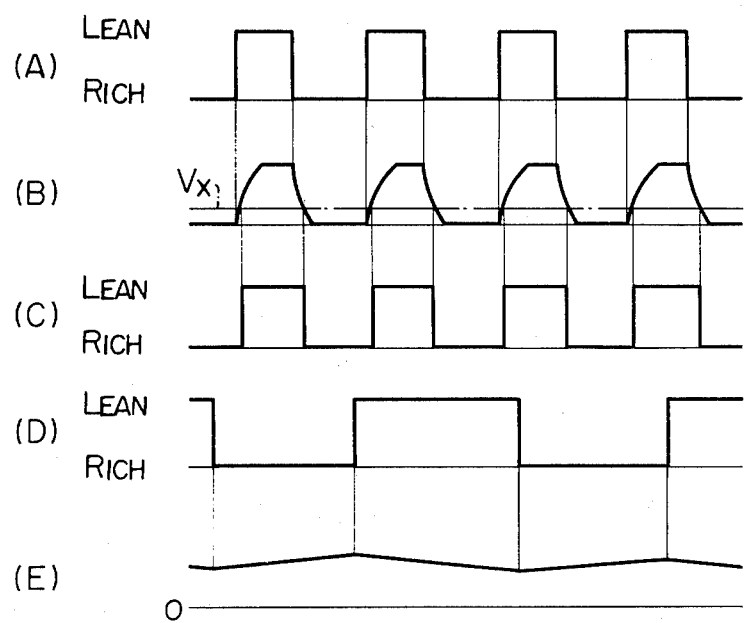
FIG. 4 is a diagram showing signal waveforms produced from various parts of the circuit shown in FIG. 3.

The delay time adjusting circuit 30 is impressed with the output voltage of the second oxygen sensor 9 and produces a low-level signal and a high-level signal as shown in (D) of FIG. 4 when the air-fuel ratio downstream of the three-way catalyst 7 is lower and higher than the predetermined value, i.e., when the mixture gas thereat is rich and lean, respectively. The integrator circuit 309 is so constructed that the output thereof increases gradually when the output of the comparator 304 is at low level (i.e., under the rich condition), while the integration output decreases gradually when the output of the comparator 304 is at high level (i.e., under the lean condition), as shown in (E) of FIG. 4. The reason why the period of the output of the second oxygen sensor 9 is larger than that of the first oxygen sensor 8 as shown in (A) and (D) of FIG. 4 is that the second oxygen sensor 9 is subjected to a response delay larger than the first oxygen sensor 8 by the three-way catalyst 7. This disadvantage is offset by the fact that the second oxygen sensor 9 placed downstream of the three-way catalyst 7 is higher in air-fuel ratio detection accuracy as shown in FIG. 1B.

Assume that the air-fuel ratio controlled by the electronic control device 6 is higher than the predetermined value (i.e., under the lean condition). Since this fact is accurately detected by the second oxygen sensor 9 downstream of the three-way catalyst 7, the period for which the high level signal is produced from the comparator 304 of the delay time adjusting circuit 30 is longer than the period for which the low level signal is produced therefrom, thus reducing the output of the integrator gradually. The reference level Vx of the comparator 205 of the delay circuit 20 is lower than the output of the integrator, and therefore the delay circuit 20 increases the delay time of the lean signal from the comparator circuit 10, while at the same time reducing the delay time of the rich signal as seen from (B) of FIG. 4. In other words, the time width of the lean signal indicative of the fact that the actual air-fuel ratio is higher than the predetermined air-fuel ratio is increased, and the air-fuel ratio is reduced through the integrator circuit 40 and the electronic control device in the subsequent stages by feedback control, thus controlling the air-fuel ratio to become the predetermined level.

The air-fuel ratio is also controlled in similar fashion when the actual air-fuel ratio is lower than the predetermined level (under the rich condition).

As described above, the air-fuel ratio control system according to the present invention comprises a comparator circuit for comparing the output signal of the first oxygen sensor disposed upstream of the three-way catalyst with a predetermined reference level, the comparator producing a signal indicative of whether the actual air-fuel ratio is higher (lean) or lower (rich) than the predetermined level, a delay circuit for delaying at least one of the signals produced from the comparator circuit, and a delay time adjusting circuit for adjusting the delay time of the signal delayed by the delay circuit, in accordance with the value of the output signal of the second oxygen sensor disposed downstream of the three-way catalyst, thus leading to the great advantage that the actual air-fuel ratio is always controlled at or about the stoichiometric ratio in spite of any variations in output characteristics of the first oxygen sensor, thereby maintaining the three-way catalyst at high purification efficiency. Further, in view of the fact that the time width of the rich and lean signals is directly adjusted by the delay circuit, the variations between oxygen sensors are accurately compensated for.

We claim:
1. An air-fuel ratio control system comprising:
   first means disposed upstream of a three-way catalyst for purifying the exhaust gas in an exhaust system of an internal combustion engine, said first means detecting an oxygen concentration and producing a first signal indicative of the detected oxygen concentration;

second means disposed downstream of said three-way catalyst, said second means detecting an oxygen concentration and producing a second signal indicative of the detected oxygen concentration;

comparator means for comparing said first signal with a reference level associated with a predetermined air-fuel ratio in order to produce a comparison-resultant lean signal and rich signal;

delay means for delaying at least one of the output signals of said comparator means;

adjusting means for adjusting the delay time of the signal delayed by said delay means, in accordance with said second signal of said second means; and control means for controlling the air-fuel ratio of mixture supplied to said internal combustion engine, in accordance with the delayed signal produced from said delay means.

2. An air-fuel ratio control system according to claim 1, wherein said delay means comprises a capacitor which is charged and discharged alternately in response to the output signals of said comparator means, and a comparator for comparing signal produced across said capacitor with another reference level to thereby produce said delayed signal, and wherein said adjusting means comprises a comparator for comparing said second signal with a further reference level, and an integrator for integrating comparison-resultant output signals of said comparator of said adjusting means to thereby adjust said another reference level of said comparator of said delay means.

* * * * *